United States Patent
Das et al.

(10) Patent No.: US 12,551,419 B2
(45) Date of Patent: Feb. 17, 2026

(54) ANTIPERSPIRANT COMPOSITION

(71) Applicant: Conopco, Inc., Englewood Cliffs, NJ (US)

(72) Inventors: Somnath Das, Bangalore (IN); Satyajit Samadder, Bangalore (IN); Philip Christopher Waterfield, Heswall (GB)

(73) Assignee: Conopco, Inc., Hoboken, NJ (US)

( * ) Notice: Subject to any disclaimer, the term of this patent is extended or adjusted under 35 U.S.C. 154(b) by 775 days.

(21) Appl. No.: 17/777,566

(22) PCT Filed: Nov. 17, 2020

(86) PCT No.: PCT/EP2020/082342
§ 371 (c)(1),
(2) Date: May 17, 2022

(87) PCT Pub. No.: WO2021/099292
PCT Pub. Date: May 27, 2021

(65) Prior Publication Data
US 2022/0409502 A1    Dec. 29, 2022

(30) Foreign Application Priority Data
Nov. 20, 2019  (EP) ..................................... 19210354

(51) Int. Cl.
| A61K 8/27 | (2006.01) |
| A61K 8/34 | (2006.01) |
| A61K 8/36 | (2006.01) |
| A61K 8/41 | (2006.01) |
| A61Q 15/00 | (2006.01) |

(52) U.S. Cl.
CPC ................ *A61K 8/27* (2013.01); *A61K 8/345* (2013.01); *A61K 8/36* (2013.01); *A61K 8/41* (2013.01); *A61Q 15/00* (2013.01); *A61K 2800/31* (2013.01); *A61K 2800/805* (2013.01)

(58) Field of Classification Search
None
See application file for complete search history.

(56) References Cited

U.S. PATENT DOCUMENTS

| 4,007,262 A | 2/1977 | Bowers |
| 4,650,671 A | 3/1987 | Golman |
| 4,915,939 A | 4/1990 | Iwahashi |
| 5,955,065 A | 9/1999 | Thong et al. |
| 2005/0238730 A1 | 10/2005 | Le Fur et al. |
| 2014/0170086 A1 | 6/2014 | Pan et al. |
| 2015/0313821 A1 | 11/2015 | Yuan et al. |
| 2015/0313822 A1 | 11/2015 | Pan et al. |
| 2016/0089315 A1 | 3/2016 | Kleinberg et al. |
| 2021/0308022 A1 | 10/2021 | Pramanik et al. |

FOREIGN PATENT DOCUMENTS

| DE | 3808114 | 9/1989 |
| DE | 19962881 | 6/2001 |
| EP | 0586235 | 3/1994 |
| JP | 63277686 | 11/1988 |
| WO | WO2008148610 | 12/2008 |
| WO | WO2013013903 | 1/2013 |
| WO | WO2013160092 | 10/2013 |
| WO | WO2014098818 | 6/2014 |
| WO | WO2019110290 | 6/2019 |
| WO | WO2019206764 | 10/2019 |
| WO | WO2020030414 | 2/2020 |
| WO | WO2022029278 | 2/2022 |

OTHER PUBLICATIONS

EP Patent Application 18188280.4 filed Aug. 9, 2018.*
International Preliminary Report on Patentability in PCT/EP2021/071962; Sep. 26, 2022; World Intellectual Property Org. (WIPO).
Written Opinion in PCT/EP2021/071962; Jul. 8, 2022; World Intellectual Property Org. (WIPO).
Co-pending U.S. Appl. No. 18/017,468, filed Jan. 23, 2023.
Search Report and Written Opinion in EP19210354.7; May 14, 2020; European Patent Office (EPO).
Search Report and Written Opinion in PCT/EP2020/082342; Jan. 22, 2021; World Intellectual Property Org. (WIPO).
B. B. Michniak, "Studies on the mechanism of topical anhidrosis due to polyvalent cations", International Journal of Cosmetic Science, 3, pp. 29-36 (1981).
Search Report and Written Opinion in PCT/EP2019/069626; Oct. 2, 2019; World Intellectual Property Org. (WIPO).
Search Report and Written Opinion in EP18188280.4; Feb. 14, 2019; European Patent Office (EPO).
Search Report and Written Opinion in EP20189795.6; Jan. 22, 2021; European Patent Office (EPO).
Search Report and Written Opinion in PCT/EP2021/071962; Nov. 5, 2021; World Intellectual Property Org. (WIPO).

* cited by examiner

Primary Examiner — Anna R Falkowitz
Assistant Examiner — Garen Gotfredson
(74) Attorney, Agent, or Firm — Stephanie Huang

(57) ABSTRACT

The present invention is in the field of personal care compositions, in particular compositions comprising antiperspirant actives. The present invention more particularly relates to compositions which do not contain the conventional and well established aluminium based actives, yet exhibit similar efficacy. This is achieved through use of an active which is a complex of a zinc salt with a β amino acid in an anhydrous carrier comprising a specific mixture of ethanol and a $C_2$ to $C_4$ glycol.

11 Claims, No Drawings

ANTIPERSPIRANT COMPOSITION

FIELD OF THE INVENTION

The present invention is in the field of compositions comprising antiperspirant actives, particularly cosmetic compositions. The present invention more particularly relates to compositions comprising zinc based antiperspirant actives which exhibit efficacy similar to or better than that of well known aluminium based actives and is delivered efficiently through a specific anhydrous carrier.

BACKGROUND OF THE INVENTION

The present invention relates to compositions, such as those that contain antiperspirant actives. These actives are added to compositions to reduce perspiration on application to the surface of the body, particularly to the underarm regions of the human body viz. the axilla. Antiperspirant actives are typically astringent metal salts such as those of aluminium or zirconium salts. Antiperspirant actives are usually incorporated in compositions at low pH, in the range of 2 to 7. There has been a thrust to develop anti perspirant actives which are less astringent and the approach has been to look for actives that do not contain aluminium. The present inventors with their extensive research in the field of zinc compounds have hit upon a zinc compound which is a complex of a zinc salt with specifically β amino alcohol which is found to have similar or better efficacy as compared to that of well-established aluminium based actives and this active has been well delivered through a specific anhydrous carrier.

Certain zinc salts have been reported as antiperspirant active. US2015313821 (Colgate) discloses an antiperspirant formulation comprising a protein and an antiperspirant salt which may be a zinc X halide complex where X is an amino acid or a trimethyl glycine.

The present inventors have tested the antiperspirant efficacy of the zinc complex of the present invention especially in the specific anhydrous carrier of the present invention and found it to be superior to that obtained with traditional aluminium chlorohydrate while having lesser amount of astringency.

It is thus an object of the present invention to provide for an antiperspirant composition which exhibits high antiperspirant efficacy while having reduced astringency.

SUMMARY OF THE INVENTION

According to the first aspect of the present invention there is provided an antiperspirant composition comprising
(i) a complex of a zinc salt with a β amino alcohol; and
(ii) an anhydrous carrier comprising a mixture of ethanol and a $C_2$ to $C_4$ glycol It is particularly preferred that the β amino alcohol is chosen from mono ethanol amine, diethanol amine, triethanol amine or 2-amino-1-butanol.

According to another aspect of the present invention there is provided a method of reducing perspiration comprising the step of applying a composition as claimed in the first aspect on to the desired skin surface.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilized in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description and claims indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

The compositions of the invention are typically "personal care compositions", suitable for cosmetic use as detailed below. Further, use of the compositions of the invention is typically cosmetic, non-therapeutic use.

In some embodiments of the present invention, the compositions may be used for the therapeutic treatment of hyperhidrosis (extreme sweating).

By "An Antiperspirant Composition" as used herein, is meant to include a composition for topical application to the skin of mammals, especially humans. Such a composition is preferably of the leave-on type. By a leave-on composition is meant a composition that is applied to the desired skin surface and left on for a period of time (say from one minute to 24 hours) after which it may be wiped or rinsed off with water, usually during the regular course of personal washing. The composition may also be formulated into a product which is applied to a human body for improving the appearance, cleansing, odor control or general aesthetics. The composition of the present invention can be an anhydrous composition which could be in the form of a gel or in stick form or may be delivered through a roll-on device. It is especially useful for delivering compositions to the axilla of an individual for anti-perspirancy benefits. "Skin" as used herein is meant to include skin on any part of the body where one may sweat (e.g., neck, chest, back, arms, underarms, hands, legs, buttocks and scalp) especially the underarms.

The present invention is directed to delivering a zinc based antiperspirant active on to the topical surface of a human body. The active for inclusion in the composition is a complex of a zinc salt with a β amino alcohol.

Suitable salt for use in preparing the complex are a chloride, formate, acetate, propionate, gluconate or citrate of zinc.

The preferred β amino alcohol for use in preparing the complex with the zinc salt is chosen from mono ethanol amine, diethanol amine, triethanol amine or 2-amino-1-butanol.

β amino alcohols have the structure as given below:

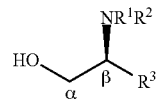

Where R1, R2 and R3 are an alkyl or aryl group which may be functionalized or is H.

When R1, R2 and R3 are functionalized, it is most preferably β-hydroxy or o-phenolic functionalized.

The structure of the preferred β amino alcohols are:
Monoethanol amine (MEA)

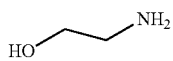

Diethanol amine (DEA)

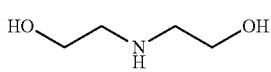

Triethanol amine

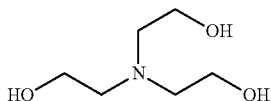

2-Amino-1-Butanol

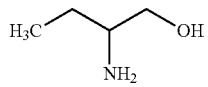

The present inventors have found that complexes of zinc salts only with β amino alcohols provide this benefit especially when incorporated in the non-aqueous carrier of the present invention. They found that this benefit is not found when α amino alcohol or γ amino alcohol are used. Without wishing to be bound by theory, the inventors believe that the complex when included in the anhydrous composition precipitates in the presence of water (available from sweat) to form a water insoluble compound. A typical example of this reaction is that when zinc acetate dihydrate ethanolamine complex is brought in contact with water it forms a precipitate which is zinc hydroxy acetate which is an insoluble compound. This precipitate could then occlude the sweat pores thereby acting as an effective anti-perspirant active.

The present inventors understood through their experimentation that such a reaction to form an insoluble precipitate occurs only when the complex is formed with a β amino alcohol. If one tries to use an α amino alcohol, the inherent stability of these alcohols makes it very difficult to prepare the complexes. When a γ-amino alcohol is used, the complex thus formed does not form an insoluble product when in contact with water thereby not forming an active that can behave as an anti-perspirant.

The complex is so included that the amount of zinc is preferably from 0.2 to 2%, more preferably from 0.5 to 1.5% by weight of the composition.

The zinc compound and the β amino acid are preferably complexed in a molar ratio in the range of 1:0.5 to 1:3, preferably in the range of 1:1 to 1:3. The present inventors have found that the desired precipitation of the complex in aqueous media of sweat is good when the molar ratio is in the claimed range, thereby providing the desired AP activity.

The pH of the composition is preferably in the range of 5 to 8. The present inventors have found that when the pH of the composition is lowered below 5 or increased above 8, the zinc complex of the invention is likely to be more solubilized in the aqueous medium of the sweat thereby making the plugging of the sweat pores difficult. Under such conditions, the anti-perspirant activity is likely to be low. Therefore a pH in the range of 5 to 8 is preferred.

Optimum antiperspirant activity of the above active is found when it is delivered through an anhydrous carrier which comprises a mixture of ethanol and an alkylene glycol wherein the alkylene group comprises C2 to C4 carbon atoms. The preferred alkylene glycols are therefore one or more of ethylene glycol, propylene glycol or butylene glycol, preferably propylene glycol. Ethanol is preferably included in 40 to 85% preferably 45 to 75% by weight of the anhydrous carrier.

The complex is preferably prepared by a process comprising the steps of (i) dissolving the β amino alcohol in the anhydrous carrier comprising the mixture of ethanol and the $C_2$ to $C_4$ glycol; and (ii) dissolving therein the zinc salt. It is preferred that the dissolution is carried out near room temperature i.e. from about 20° C. to about 40° C. The dissolution is preferably carried out in each of the individual steps for about 5 minutes to 30 minutes. Further preferably the solution of the complex is mixed to ensure complete dissolution from 1 hour to about 8 hours.

The complex so prepared is preferably dissolved or suspended in the anhydrous carrier during the preparation of the composition of the invention.

Antiperspirant compositions of the present invention may advantageously comprise an additional, non-zinc based antiperspirant active. Whilst this might be a conventional antiperspirant salt comprising Al and/or Zr, such as aluminium chlorohydrate or aluminium-zirconium chlorohydrate optionally complexed with glycine, it is preferred that any additional antiperspirant active is not of this type.

Other components commonly included in conventional antiperspirant compositions may also be incorporated in the compositions of the present invention. Such components include skin care agents such emollients, humectants and skin barrier promoters; skin appearance modifiers such as skin lightening agents and skin smoothing agents; anti-microbial agents, in particular organic anti-microbial agents, and preservatives.

The anti-perspirant active can be applied cosmetically and topically to the skin. In the method of the invention, the composition is wiped across the surface of the skin, depositing a fraction of the composition as it passes. The composition of the invention is preferably delivered through a skick or a gel form or using a roll on.

Stick or Soft Solid Compositions

Many different materials have been proposed as gellant for a continuous oil phase, including waxes, small molecule gelling agents and polymers. They each have their advantages and of them, one of the most popular class of gellant has comprised waxes, partly at least due to their ready availability and ease of processing, including in particular linear fatty alcohol wax gellants. A gelled antiperspirant composition is applied topically to skin by wiping it across and in contact with the skin, thereby depositing on the skin a thin film.

The nature of the film depends to a significant extent on the gellant that is employed. Although wax fatty alcohols have been employed as gellant for many years, and are effective for the purpose of gelling, the resultant product is rather ineffective at improving the visual appearance of skin, and in particular underarm skin, to which the composition has been applied. This problem has been solved by including ameliorating materials for example, di or polyhydric humectants and/or a triglyceride oil.

Roll-On

Liquid compositions that are applicable from a roll-on broadly speaking can be divided into two classes, namely those in which an antiperspirant active is suspended in a hydrophobic carrier, such as a volatile silicone and those in which the antiperspirant active is dissolved in a carrier liquid. The latter has proven to be more popular. There are mainly two sorts of dissolving carrier liquid, namely carriers that are predominantly alcoholic, which is to say the greater part of the dissolving carrier fluid comprises ethanol and the second class in which the carrier liquid is mainly water. The former was very popular because ethanol is a mild bactericide in its own right, but its popularity waned because it stings, especially if the surface onto which the composition has been applied has been damaged or cut, such as can easily arise during shaving or other de-hairing operations.

The second class of formulations that is an alternative to alcoholic formulations comprise a dispersion of water-insoluble or very poorly water soluble ingredients in an aqueous solution of the antiperspirant. Herein, such compositions will be called emulsions. Antiperspirant roll-on emulsions commonly comprise one or more emulsifiers to maintain a distribution of the water-soluble ingredients.

When the composition of the invention is delivered in a roll-on, a firm solid or a stick format, the topically acceptable carrier comprises a hydrophobic carrier or an aqueous carrier. The hydrophobic carrier in such cases may comprise a silicone compound, low boiling alcohol or a wax.

The composition of the present invention can comprise a wide range of other optional components. The CTFA Personal care Ingredient Handbook, Second Edition, 1992, which is incorporated by reference herein in its entirety, describes a wide variety of non-limiting personal care and pharmaceutical ingredients commonly used in the skin care industry, which are suitable for use in the compositions of the present invention. Examples include: antioxidants, binders, biological additives, buffering agents, colorants, thickeners, polymers, astringents, fragrance, conditioners, exfoliating agents, pH adjusters, preservatives, natural extracts, essential oils, skin sensates, skin soothing agents, and skin healing agents.

The present invention also provides for a method of reducing perspiration comprising the step of applying the composition of the first aspect on to the desired skin surface. The skin surface could be any topical surface which is prone to sweating especially the axilla i.e. the underarm portion of the human body. The method is preferably non-therapeutic. The invention also provides for use of a complex of a zinc salt with a β amino alcohol for manufacture of a composition of the present invention, for reduction of sweat.

The invention will now be demonstrated with the help of the following non-limiting examples.

EXAMPLES

Examples A-B, 1-4: Percentage Flow Rate Reduction Across a Membrane Coated with Antiperspirant Active Example A: Aluminium chlorohydrate (ACH) aqueous solution (12% w/w solution was used)

Example B, 1-4: Complex of zinc acetate dihydrate and 2-amino-1-butanol in 1:1 molar ratio in an anhydrous base as shown in the table below was prepared The complex (100 g batch size) was prepared in a process as described below for Example—4 using the materials as listed in Table—1 below. For the various other examples, the amount of ethanol and propylene glycol was varied as given in Table—2 below: Required amount of ligand (Here, 2-amino-1-butanol (2A1B)) was added in

TABLE 1

| Compounds | Mw (g/mol) | CAS no. | Wt(g) |
| --- | --- | --- | --- |
| Zinc acetate dihydrate | 219.49 | 5970-45-6 | 3.5 |
| 2-Amino-1-butanol (2A1B) | 89.14 | 96-20-8 | 1.5 |
| Glycerol | 92.09 | 56-81-5 | 0.5 |
| Ethanol | 46.07 | 64-17-5 | 45 |
| Propylene glycol | 76.09 | 57-55-6 | 45 |
| Cetyl alcohol | 242.44 | 36653-82-4 | 2 |
| Brij 72 | Not available | | 2 |
| Brij S 20 | Not available | 9005-00-9 | 0.5 |

Synthesis Protocol:

Step—1

In required amount of ethanol, 2-amino-1-butanol was added and stirred well. In this solution, required amount of zinc acetate dihydrate free-flowing powder was added and stirred well at about 600 rpm to get a clear solution, thus the complex was obtained having 1:1 molar ratio of Zn and 2-amino-1-butanol.

Step—2

Required amount of Cetyl alcohol, Brij 72 Brij S 20, and propylene glycol were mixed and maintained at 60° C. A clear solution is obtained in this method. The clear solution was allowed to cool down to room temperature (about 25° C.) with occasional shaking.

Step—3

In this final step, the solution obtained in the step-2 was added to the solution obtained in step—1 with continuous stirring at about 600 rpm.

The final formulation at step-3 was used for further studies.

TABLE 2

| Example | Ethanol (wt %) in anhdrouos carrier | Propylene Glycol (wt %) in anhydrous carrier | Complex and additives (wt %) |
| --- | --- | --- | --- |
| B | 90 | 0 | 10 |
| 1 | 75 | 15 | 10 |
| 2 | 65 | 25 | 10 |
| 3 | 55 | 35 | 10 |
| 4 | 45 | 45 | 10 |

For preparing Zn-alcoholamine complex coated membrane:

Whatman™ Cellulose Nitrate Membrane Filters being used having 50 mm diameter and 12-micron nominal pore size (Whatman™ 10400014 Grade AE100) was coated with the requisite volume of aqueous anti-perspirant composition by dropwise addition of the solution with the help of a micropipette ensuring proper spreading. The coated membranes were then placed inside a high humidity chamber (RH>90%) for 4 hours. The membranes were taken out and kept at ambient condition (25° C., 70% RH, loosely covered with a lid without any contact with membranes overnight.

For Preparing ACH Coated Membrane:

Whatman™ Cellulose Nitrate Membrane Filters being used having 50 mm diameter and 12-micron nominal pore size (Whatman™ 10400014 Grade AE100) was coated with the requisite volume of aqueous ACH active by dropwise addition of the solution with the help of a micropipette ensuring proper spreading. The coated membranes were then placed inside ammonia vapor blanket (10-15% w/w aqueous ammonium hydroxide solution kept inside a closed desiccator) for 3 hours. The membranes were taken out and kept at ambient condition (25° C., 70% RH, loosely covered with a lid without any contact with membranes) overnight.

The percentage flow rate reduction was calculated using the equation:

$$\text{percentage flow rate reduction } (PFRR) := \frac{[\text{control membrane flow rate } (mL/min) - \text{coated membrane flow rate } (mL/min)]}{[\text{control membrane flow rate}(mL/min)]} \times 100$$

The data on PFRR of the samples is given in Table—3 below:

TABLE 3

| Example | Avg % PFRR N = 8 |
|---|---|
| A | 88 |
| B | 70 |
| 1 | 87 |
| 2 | 92 |
| 3 | 95 |
| 4 | 100 |

The data in Table—3 above indicates that the composition as per the invention (Examples 1-4) provides for almost the same or much better antiperspirant activity as compared to the most commonly used commercial anti perspirant active (Example A). These compositions are also better than when only ethanol is used as the anhydrous carrier (Example B).

The invention claimed is:

1. An antiperspirant composition comprising:
   (i) a complex of a zinc salt with a β amino alcohol; and
   (ii) an anhydrous carrier comprising a mixture of ethanol and a $C_2$ to $C_4$ glycol.

2. The composition as claimed in claim 1, wherein the $C_2$ to $C_4$ glycol is propylene glycol.

3. The composition as claimed in claim 1, wherein ethanol is included in 40 to 85% by weight of the anhydrous carrier.

4. The composition as claimed in claim 1, wherein said zinc salt is selected from a chloride, formate, acetate, propionate, gluconate, citrate, or mixtures thereof.

5. The composition as claimed in claim 1, wherein said β amino alcohol is selected from mono ethanol amine, diethanol amine, triethanol amine, 2-amino-1-butanol, or mixtures thereof.

6. The composition as claimed in claim 1, wherein a molar ratio of zinc salt to β amino alcohol is from 1:0.5 to 1:3.

7. The composition as claimed in claim 1, wherein the composition comprises 0.2 to 2% zinc by weight of the composition.

8. The composition as claimed in claim 1, wherein the complex is prepared using a process comprising the steps of:
   (i) dissolving the β amino alcohol in the mixture of ethanol and $C_2$ to $C_4$ glycol; and
   i) dissolving therein the zinc salt.

9. The composition as claimed in claim 8, wherein the dissolution is carried out from about 20° C. to about 40° C.

10. A method of reducing perspiration comprising the step of applying the composition as claimed in claim 1 to a desired skin surface.

11. The composition as claimed in claim 1, wherein a molar ratio of zinc salt to β amino alcohol is from 1:1 to 1:3.

* * * * *